3,312,609
BRINE ELECTROLYSIS
Morton S. Kircher, Vancouver, British Columbia, Canada, assignor to Hooker Chemical Corporation, Niagara Falls, N.Y., a corporation of New York
No Drawing. Filed Oct. 5, 1965, Ser. No. 493,255
2 Claims. (Cl. 204—98)

This is a continuation-in-part of copending application Ser. No. 133,331, filed Aug. 23, 1961, now abandoned.

This invention relates to the electrolysis of brine using porous diaphragm type cells. More particularly, the invention relates to a method for converting hydrogen chloride into chlorine by introducing hydrogen chloride into the anolyte of porous diaphragm type caustic-chlorine cells during the electrolysis of brine without increasing the height of the cell or the rate of graphite consumption, but with an increased overall operation efficiency.

In the production of chlorinated organic materials such as carbon tetrachloride, trichloroethylene and the like from hydrocarbons, large quantities of chlorine are needed. This chlorine is usually supplied from electrolytic chlorine cells installed at the plant site. However, the large amounts of by-product hydrogen chloride produced in the chlorination need to be disposed of. Frequently there is an excess over the sales demand. Also there are produced with the chlorine large quantities of alkali metal hydroxide which need to be sold, and which at times over the past few years has been in excess over the sales demand.

It has been suggested that by adding the surplus hydrogen chloride to the anolyte of deposited diaphragm chlorine-caustic cells, the hydrogen chloride would be converted into saleable chlorine and hydrogen and the amount of alkali metal hydroxide produced be reduced proportionately thereby. However, as was demonstrated by R. L. Murray and M. S. Kircher, "Transactions of the Electrochemical Society," 86: 83–106 (1944), acid addition to brine in deposited diaphragm cells causes substantial changes in the cell operation. For instance, the diaphragm tends to tighten up faster causing an abnormal rise in the brine level. This has since been confirmed by Heiskell in United States Patent 2,954,333. The diaphragm also has had a shorter life.

Therefore, it is an object of this invention to provide a method for disposing of hydrogen chloride and recovering the chlorine and hydrogen values therein by use of porous diaphragm type chlorine-caustic cells.

Another object is to provide a method for reducing the amount of alkali metal hydroxide produced without reducing the amount of chlorine and hydrogen produced in porous diaphragm type chlorine-caustic cells.

Another object is to provide a method of electrolyzing brine in porous diaphragm type cells at higher than normal anode current efficiency.

Another object is to provide a method for electrolyzing brine in porous diaphragm type cells at higher than normal anode current efficiency.

Another object is to provide a method for electrolyzing brine in porous diaphragm type cells wherein the catholyte is maintained at a higher than normal concentration without impairing the normal life of the diaphragm; thereby reducing the evaporation costs in recovering the caustic therefrom.

Still another object is to provide a method of disposing of hydrogen chloride in porous diaphragm type brine cells which does not increase the normal graphite consumption rate.

Still another object is to provide a method of disposing of hydrogen chloride in porous diaphragm type brine cells which does not necessitate allowing for an abnormal increase in brine level due to the diaphragm tightening up faster than the normal rate.

I have discovered a relationship among the operating conditions of porous diaphragm cells which permits the addition of as much as twenty percent by weight and higher of hydrogen chloride equivalent of the theoretical chlorine production without increasing the brine level beyond that normally used for chlorine-alkali production without acid addition, and without increasing the graphite consumption rate. In fact, there appears to be even an improvement in anode current efficiency over that attainable without the hydrogen chloride addition. It has been discovered that this can be accomplished by controlling the brine feed relative to the acid feed to the anolyte so that the anolyte pH remains within ranges so that the production of alkali metal hydroxide can be controlled relative to the production of chlorine, and so that the concentration of alkali metal hydroxide in the catholyte is increased without a sacrifice of graphite above normal.

By predetermined normal anolyte level is meant that level at which the anolyte is maintained in the anode compartment of the cell under normal conditions at any given time in the cell's diaphragm life. For instance, in Hooker Type S–1 cell, with a new diaphragm the anolyte level is maintained about three inches above the electrodes, and as the diaphragm plugs up under normal operation, the anolyte level is permitted to rise to about thirteen inches above the electrodes. Similarly, with other commercial types of porous diaphragm cells the normal anolyte level ranges are known to those of ordinary skill in this art.

For the most profitable operation of the deposited diaphragm type chlorine-caustic cells, it has been found advantageous to maintain the anolyte at a pH range of about 1.5 to 4.0 and preferably in the range of 2.0 to 3.5. At a pH below 1.5, the diaphragm plugs or tightens up more rapidly. At a pH above 4.0, there is a greater evolution of oxygen and carbon dioxide, and a higher consumption of graphite, so that cell current efficiency and anode life both drop.

The pH of the anolyte is measured by withdrawing a sample of anolyte from the anode compartment and measuring its pH with a suitable instrument. A particularly advantageous withdrawal point in the Hooker Type S deposited diaphragm cell is from the sight glass positioned in the front of the cell and in communication with the anode compartment.

I have now found that the pH of the anolyte in porous diaphragm chlorine-caustic cells can be maintained within this desired operating range while feeding hydrogen chloride to the anolyte in molar amounts up to twenty percent relative to the theoretical chlorine production per unit time, by maintaining a lower brine feed rate and by maintaining an above-normal concentration of alkali metal hydroxide in the catholyte.

I have found further that the ratio of brine feed rate to acid (hydrogen chloride) feed rate cannot be given a constant value for any given acid feed rate, but depends upon the properties of the porous diaphragm and other factors. The properties of the diaphragm in turn are dependent upon various factors as weight per unit area, pH of the anolyte, concentration of alkali metal hydroxide in the catholyte and various impurities in the anolyte such as calcium, magnesium, iron, sulfate and silicate. Further the pH of the anolyte is dependent upon the rate of acid added to the anolyte and I have observed that it is also dependent upon the rate of anolyte flow through the diaphragm.

Under normal conditions the brine is nearly saturated at about 60–70 degrees centigrade and contains between about 310 and about 325 grams per liter NaCl, when entering the cell with 315 g.p.l. NaCl being a typical concentration. On the other hand the anolyte in the cell normally has a temperature between about 90 and about 104 degrees centigrade, preferably between about 94 and about 98 degrees centigrade, and contains about 270 grams per liter NaCl. Addition of hydrogen chloride to the anolyte in accordance with this invention will not substantially alter the temperature conditions of the brine and anolyte, but will tend to reduce the g.p.l. concentration of NaCl in them, depending on the proportion of acid added.

My invention can also be applied to the electrolysis of potassium chloride in deposited diaphragm cells, if the economics of this presently high-cost electrolysis change. The normal conditions of the KCl brine electrolysis are approximately comparable on a molar basis to that of the NaCl brine electrolysis.

Under normal conditions, the alkali metal hydroxide concentration in the catholyte is maintained in a range of about 10.9 percent (or about 130 grams NaOH per liter) to below 11.5 percent (or below about 140 grams NaOH per liter), because at higher caustic concentrations the current efficiency is lowered, and there is excessive graphite consumption. However, I have found that when operating in accordance with this invention the catholyte is maintained at higher caustic concentrations of above at least 12.01 percent hydroxide by weight sodium, yet with a normal or improved current efficiency and without a graphite consumption rate above normal, or diaphragm life below normal. On the more accurate basis of grams per liter NaOH, this is equivalent to a minimum of 149 g.p.l. NaOH, or 3.725 mol per liter alkali metal hydroxide. I have profitably operated cells in accordance with my invention at catholyte caustic concentrations as high as 20.0 percent NaOH.

The resultant salt to caustic ratio (S/C) in the catholyte normally ranges between about 1300 and 1500 pounds of NaCl per 1000 pounds of NaOH produced, with 1446 being a typical S/C ratio. Of course, while maintaining maximum current efficiency, etc., it is desired to have a low resultant salt to caustic ratio, for then lesser amounts of salt would need to be removed from the NaOH, per unit of caustic produced. When acid is added to the anolyte in accordance with my invention, the resultant salt to caustic ratio is substantially below this normal range and no greater than about 1250. Ratios lower than 618 have been realized while maintaining operating conditions which give maximum current efficiency.

The process of my invention can be operated in any one of several ways. I have found that the central consideration in profitably electrolyzing the materials is to maintain the anolyte during continuous operation within a pH range of 1.4 to 4.0, or preferably 2.0 to 3.5. Where hydrogen chloride disposal is the major desire, then a convenient method of operation is to set the acid feed rate at the desired amount, and then to maintain the brine feed at a (lower) rate which maintains the anolyte pH within the stated range, while the concentration of the alkali metal hydroxide in the catholyte is maintained above at least 3.725 moles per liter alkali metal hydroxide.

Another method of operation is to set the caustic concentration and rate of withdrawal of catholyte desired, and then to adjust the brine feed and acid feed rates to maintain the anolyte pH within the stated range.

Still other methods of operation are possible and I do not want to be limited to those given except as defined in the appended claims.

It is to be understood the hydrogen chloride may be fed into the anolyte in any convenient manner. It can be introduced directly into the anolyte as a separate feed stream, either as a gas or more preferably as a concentrated aqueous solution (muriatic acid). It is preferred to introduce it into the brine being fed into the cell, thereby eliminating the necessity of having another opening in the cell. Also, under some operating conditions, this helps to adjust the brine feed to a more preferred pH prior to its being introduced into the anolyte.

To further illustrate my invention the following examples are given, however I do not want to be limited to them except as defined in the appended claims.

*Example 1.—Prior art acid addition*

The data recorded in Run 17 of the Murray and Kircher publication Transactions of the Electrochemical Society 86: 83–106 (1944), is given here to illustrate the results obtained in accordance with the prior art.

A Hooker Type S cell operating at approximately 7600 amperes was fed with brine containing 23.38 percent NaCl, and 0.25 percent hydrogen chloride, at a constant rate through an orifice tube in the top of the cell. The hydrogen chloride content of the brine was calculated to correspond to 4.6 percent by weight of the theoretical chlorine production rate. The cell liquor produced contained 11.58 present NaOH and 9.35 percent NaCl. During the run, which extended for a period of twenty-two hours, the level of the anolyte increased from a point 4⅝" above the level of the electrodes to a point 8¼" above the electrodes. The pH of the anolyte decreased from 2.3 at the start of the run to approximately 0.7 during the run.

Because of the increase in anolyte level, the acid content of the feed brine was decreased to 0.04 percent corresponding to 1.5 percent of the equivalent chlorine production rate. The run was continued (as Run 18), for a period of twenty-four hours. The average composition of cell liquor produced was 12.0 percent NaOH and 11.8 percent NaCl. The anolyte pH increased from 0.7 to 3.3 during the run. The anolyte level continued to increase from 8¼" to 10" above the electrodes.

After thirteen days of normal operation, Run 20 was made without hydrogen chloride addition, the anolyte level decreased to 8¾" and the pH increased to 4.3.

The analysis of chlorine gas and the chlorine current efficiency corresponding to the three conditions of operation are tabulated as follows:

|  | HCl, Percent of Theor. $Cl_2$ | Vol. Percent | | | Current Efficiency Calcd. on $Cl_2$, Percent |
| --- | --- | --- | --- | --- | --- |
|  |  | $Cl_2$ | $CO_2$ | $O_2$ |  |
| Run 17 | 4.6 | 99.22 | .43 | .29 | 98.8 |
| Run 18 | 1.5 | 98.30 | 1.30 | .30 | 96.5 |
| Run 20 | 0 | 94.83 | 3.06 | 1.77 | 87.8 |

It was observed that the low anolyte pH caused tightening of the diaphragm and therefore the anolyte level continued to increase even after the acid rate was reduced and the anolyte pH allowed to rise to 3.3. Even after thirteen days of continued operation with pH in the range of 3.0–4.3, the anolyte level did not return to the initial level of approximately 5 inches.

*Example 2*

A group of fourteen Hooker Type S cells operating in series at an amperage of approximately 12,000 amperes was fitted with orifice feeds to introduce continuously muriatic acid at a controlled rate to the anolyte in addition to the normal controlled brine feed and operated at a constant acid rate, for times varying from one week to one month. A table of data representing the average of fourteen cells for a typical day's period is shown below. In Test I, the cells were operating normally with no acid addition. In Test II, acid was fed to the cells at an average rate of 60.1 milliliters per minute; in Test III the acid rate was increased to an average rate of 71.5 milliliters per minute, and in Test IV, the acid rate was increased to an average rate of one hundred and thirty-two milliliters per minute.

anolyte pH ranged from 0.8 to 1.3, and the level of the anolyte increased from ¾ of an inch to five inches.

Such a condition if continued, would have rendered the cell inoperative. Hence the brine feed rate was reduced to 1900 ml./min. and the acid feed rate to 46 ml./min.

TABLE

|  | Test I No Acid | Test II 10% HCl | Test III 12% HCl | Test IV 21% HCl | Test V 2.2% HCl |
|---|---|---|---|---|---|
| Current | 12,000 | 12,000 | 12,000 | 12,000 | 12,000 |
| CE by gas analysis | 96.1 | 95.9 | 96.3 | 98.4 | 95.7 |
| Brine feed rate, ml./min | 2,766 | 1,905 | 1,954 | 1,760 | 2,522 |
| Acid feed rate, ml./min | zero | 60.1 | 71.5 | 132 | 14.4 |
| Avg. pH of anolyte | 3.83 | 4.05 | 3.23 | 2.7 | 3.23 |
| Avg. g.p.l. NaOH | 133.6 | 185 | 188.6 | 202.4 | 149.0 |
| Avg. Percent NaOH [2] | 10.95 | 15.16 | 15.40 | 16.60 | 12.21 |
| Avg. S/C ratio, lbs. NaCl/1,000 lbs. NaOH | 1,446 | 830 | 826 | 618 | 1,243 |
| Avg. level,[1] in | 1.23 | 2.35 | 1.63 | 1.0 | 0.85 |
| Temp. catholyte, °C | 94.0 | 96.2 | 96.6 | 97.0 | 96.1 |
| Temp. anolyte, °C | 91.0 | 94.2 | 95.4 | 96.0 | 93.3 |
| Volts | 3.71 | 3.72 | 3.76 | 3.55 | 3.69 |
| Percent CE represented by HCl | 0 | 10 | 12 | 20.8 | 2.2 |
| Lbs. Cell liquor/lbs. NaOH | 9.1 | 6.6 | 6.6 | 6.1 | 8.3 |
| Water to be evaporated to produce 50% NaOH, lbs. H₂O/lbs. NaOH | 5.7 | 3.8 | 3.8 | 3.5 | 5.1 |
| Chlorate, lbs. NaClO₃/1,000 lbs. NaOH | 0.83 | 0.97 | 0.97 | 0.7 | 0.73 |

[1] The above levels are with reference to an arbitrary point on the sight glass. To convert to height above electrodes add three inches.

[2] In the results presented in Tests I through V the average percent NaOH in the catholyte has been approximated from the more accurate g.p.l. NaOH values, and not from direct analytical analyses or from analyses calculated from specific gravity values. At any given g.p.l. NaOH value, the percent NaOH can vary to some extent during electrolysis because it is dependent upon the total composition of the catholyte. However, in Test V, where the p.g.l. NaOH value is 149.0, under these conditions the average percent NaOH in the catholyte could be as low as 12.02 percent NaOH but for the average situation would be 12.21, as indicated.

In Tests II and III, the amount of acid added is equivalent stoichiometrically to ten and twelve percent respectively, of the total chlorine production from the cells used, and the amount of water to be evaporated from the cell liquor to produce fifty percent NaOH has been lowered from 5.7 lbs. water/lb. NaOH to 3.8 lbs. water/lb. NaOH, which is an improvement in decreased evaporation costs of thirty-three percent, based on actual caustic produced.

It will be noted in the above tests that the average anolyte pH was maintained within the range of 3.2 to 4.05 and that the brine feed rate was decreased from 2766 cc./cell/minute in Test I to 1905 cc./cell/minute in Test II to 1954 cc./cell/minute in Test III, to 1760 cc./cell/minute in Test IV. The average cell levels were 1.23 inches, 2.35 inches, 1.63 inches and 1.0 inch respectively, indicating no appreciable change due to the addition of the acid.

Under the operating conditions of the above Tests II through IV, it would be expected that the anode and cathode lives would not differ markedly from the respective anode and cathode lives of cells being operated under normal conditions.

*Example 3*

In the Hooker Type S cell, the level of anolyte increases during the life of the diaphragm as the diaphragm becomes plugged with impurities. This increase amounts to approximately ten inches over a period of several months. Hence in normal operation the change in level in a period of twenty-four hours is imperceptible. The following example illustrates how the level of the anolyte increases when the acid and brine rates are not controlled to maintain the anolyte at a pH above 1.5.

For the test a cell was selected which had been in continuous operation for several weeks with an anolyte level stable at approximately 0.75-1.5 inches, with a current of 12,000 amperes and a brine feed rate of 2300 milliliters per minute. At the beginning of the test, the cell was operating at an acid feed rate of 26.5 milliliters per minute and an anolyte pH of 3.7.

The acid rate was then increased to sixty-one milliliters per minute and maintained at this rate for a period of twenty-four hours without changing the brine rate. During this twenty-four hour period from the start, the At these rates an anolyte pH increased to 3.3-4.1, and after seventy-two hours, the anolyte level decreased to 2¾".

Although I have demonstrated my invention in Hooker Type S cells, it is apparent that my method will also be operative in other electrolytic cells of the porous diaphragm type used in the electrolysis of aqueous alkali metal halide solutions.

It is to be understood that in the continuous process of this invention the porous diaphragms used in the electrolytic cell means are in their normal condition for their life. That is, they have not previously been caused to tighten up or plug up as a result of acid addition to the anolyte in a manner which caused them to tighten up abnormally, as was done in the Murray-Kircher article, supra and Heiskell 2,954,333.

Various modifications can be made to the above method which are apparent to one of ordinary skill in this art, and I do not want to be limited except as defined in the appended claims.

I claim:

1. In a method for continuously electrolyzing aqueous alkali metal chloride brine to produce chlorine, hydrogen and alkali metal hydroxide under the influence of a decomposition voltage and using a porous diaphragm type cell means, wherein brine and hydrogen chloride are being fed into the anolyte of said cell means, the improvement which comprises: maintaining the anolyte pH in a normal range between 1.4 and 4.0 and maintaining the anolyte level in said cell means at its predetermined normal level so that the said porous diaphragm is prevented from tightening up from the hydrogen chloride addition by maintaining the alkali metal hydroxide concentration in the catholyte above at least 3.725 moles per liter alkali metal hydroxide by controlling the brine and hydrogen chloride feed rates.

2. In a method for continuously electrolyzing aqueous sodium chloride brine to produce chlorine, hydrogen and sodium hydroxide under the influence of a decomposition voltage and using a deposited diaphragm type cell means, wherein brine and hydrogen chloride are being fed into the anolyte of said cell means, the improvement which comprises maintaining the anolyte pH in a normal range between 1.4 and 4.0 and maintaining the anolyte level in said cell means at its predetermined normal level so that the deposited diaphragm is prevented from tightening up from the hydrogen chloride addition by maintaining the sodium hydroxide concentration in the catholyte above at least 149.0 grams per liter NaOH by controlling the brine and hydrogen chloride feed rates.

References Cited by the Examiner

UNITED STATES PATENTS 2,954,333  9/1960  Heiskell et al. _____ 204—98

OTHER REFERENCES

Murray et al.: Transactions of the Electrochemical Society, volume 86, pages 86, 87 and 105.

Hooker Type S Cells, Bulletin 20–A, page 2, 1959.

JOHN H. MACK, *Primary Examiner.*

H. M. FLOURNOY, *Assistant Examiner.*